US008304118B2

(12) United States Patent
Yoon et al.

(10) Patent No.: US 8,304,118 B2
(45) Date of Patent: Nov. 6, 2012

(54) NON-AQUEOUS ELECTROLYTE SOLUTION FOR LITHIUM SECONDARY BATTERY AND LITHIUM SECONDARY BATTERY INCLUDING THE SAME

(75) Inventors: Su-Jin Yoon, Gyeonggi-do (KR); Sung-Hoon Yu, Gyeonggi-do (KR); Jong-Ho Jeon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/201,897

(22) PCT Filed: Feb. 26, 2010

(86) PCT No.: PCT/KR2010/001265

§ 371 (c)(1), (2), (4) Date: Dec. 29, 2011

(87) PCT Pub. No.: WO2010/098639

PCT Pub. Date: Sep. 2, 2010

(65) Prior Publication Data

US 2012/0088161 A1 Apr. 12, 2012

(30) Foreign Application Priority Data

Feb. 26, 2009 (KR) ........................ 10-2009-0016357
Feb. 26, 2010 (KR) ........................ 10-2010-0017589

(51) Int. Cl.
*H01M 10/05* (2010.01)

(52) U.S. Cl. ........................................ 429/332; 429/188

(58) Field of Classification Search .................. 429/303, 429/317, 231.8, 105, 199, 338, 332, 188, 429/342; 29/623.1

See application file for complete search history.

(56) References Cited

U.S. PATENT DOCUMENTS 7,659,036 B2 * 2/2010 Kim et al. .................... 429/251
2006/0269834 A1 * 11/2006 West et al. .................... 429/105
2007/0048616 A1 * 3/2007 Okumura et al. ............ 429/303
2007/0212615 A1 9/2007 Jost et al.
2007/0287070 A1 12/2007 Okumura et al.

FOREIGN PATENT DOCUMENTS

EP 0704921 A1 4/1996
KR 2008-0053399 A 6/2008

OTHER PUBLICATIONS

International Search Report, PCT/KR2010/0001265, dated Sep. 30, 2010.

* cited by examiner

*Primary Examiner* — Jennifer Michener
*Assistant Examiner* — Monique Wills
(74) *Attorney, Agent, or Firm* — Lerner, David, Littenberg, Krumholz & Mentlik, LLP

(57) ABSTRACT

Disclosed is a non-aqueous electrolyte solution for a lithium secondary battery. The non-aqueous electrolyte solution includes an electrolyte salt and an organic solvent. The non-aqueous electrolyte solution further includes (a) a polyfunctional compound including two or more functional groups, at least one of which is an acryl group, and (b) an anion receptor selected from the group consisting of a borane compound, a borate compound and a mixture thereof. Further disclosed is a lithium secondary battery including the non-aqueous electrolyte solution. A stable solid electrolyte interface (SEI) film is formed on an anode of the lithium secondary battery. The amount of LiF in the SEI film is controlled, achieving improved cycle life characteristics of the battery.

10 Claims, 1 Drawing Sheet

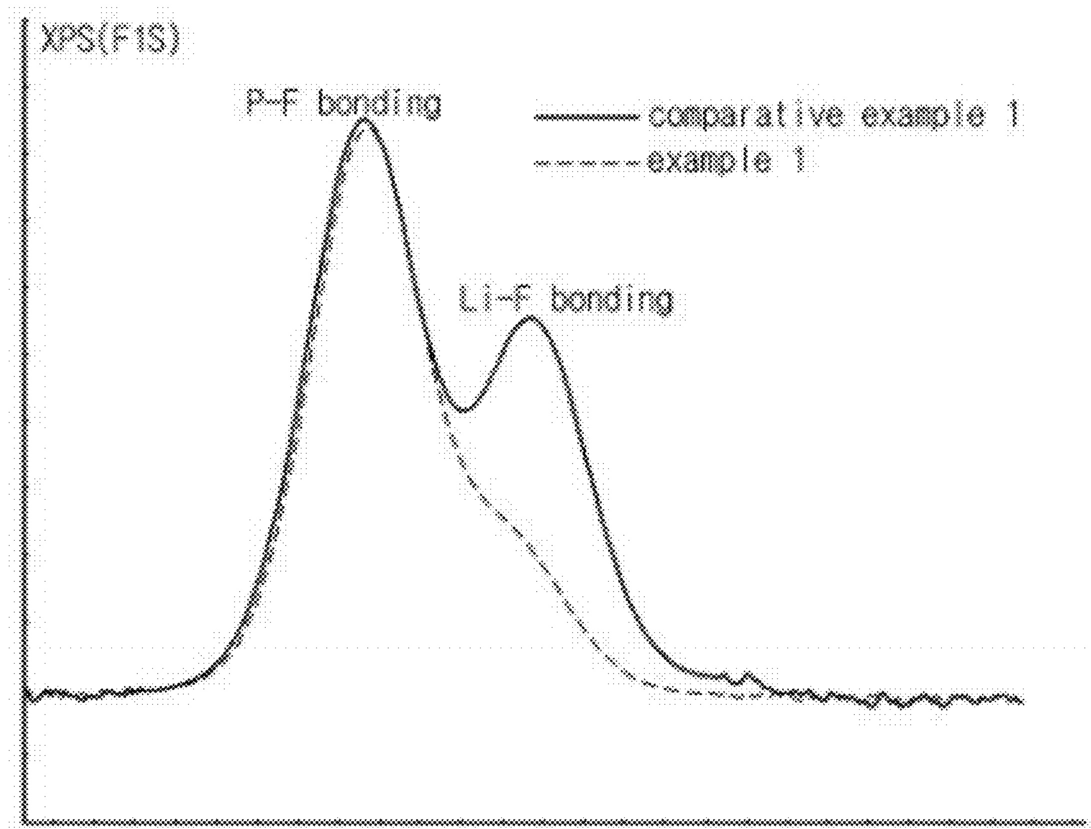
XPS(F1S)
P-F bonding
Li-F bonding
comparative example 1
example 1

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. §371 of International Application No. PCT/KR2010/001265 filed on Feb. 26, 2010, published in Korean, which claims priority from Korean Patent Application No. 10-2009-0016357 filed in the Republic of Korea on Feb. 26, 2009, and Korean Patent Application No. 10-2010-0017589 filed in the Republic of Korea on Feb. 26, 2010, the disclosures of said applications are incorporated by referenceherein.

TECHNICAL FIELD

The present invention relates to a non-aqueous electrolyte solution for a lithium secondary battery and a lithium secondary battery including the same.

BACKGROUND ART

Energy storage technology is attracting more and more attention in recent years. As the applicability of energy storage technology is extending to mobile phones, camcorders, notebook PCs and even electric automobiles, there is a growing demand for high energy-density batteries as power sources for such electronic devices. Under these circumstances, lithium secondary batteries are considered as the most promising batteries and research on lithium secondary batteries is being actively undertaken.

A typical lithium secondary battery includes an anode, a cathode and a non-aqueous electrolyte solution to provide channels through which lithium ions migrate between the two electrodes, and produces electrical energy by redox reactions occurring when the lithium ions are intercalated into and deintercalated from the cathode and the anode. Such secondary batteries are currently in the spotlight due to their higher operating voltages and much higher energy densities than conventional batteries, such as Ni-MH, Ni—Cd, sulfuric acid-lead batteries. However, the performance of lithium secondary batteries is deteriorated by repeated charge/discharge cycles, which is a problem. This problem becomes more serious as the capacity density of batteries increases.

In order to solve the above problems, proposals have been made for forming solid electrolyte interface (SEI) films by adding a variety of compounds to non-aqueous electrolyte solutions. For example, Japanese Unexamined Patent Publication No. 1996-45545 discloses a method for forming SEI film using vinylene carbonate (VC). However, it is known that this SEI film has a slightly high resistance and tend to collapse at high temperature.

Thus, research is continuing on non-aqueous electrolyte solutions that form stable SEI films and are optimized for lithium secondary batteries with markedly improved cycle life characteristics.

DISCLOSURE

Technical Problem

It is an object of the present invention to provide a non-aqueous electrolyte solution for a lithium secondary battery that forms a stable SEI film on an anode and can control the amount of LiF in the SEI film, achieving improved cycle life characteristics of the battery.

It is another object of the present invention to provide a lithium secondary battery including the non-aqueous electrolyte solution applied to a particular anode using an aqueous binder to achieve improved cycle life characteristics.

Technical Solution

In order to achieve these objects, the present invention provides a non-aqueous electrolyte solution for a lithium secondary battery including an electrolyte salt and an organic solvent, wherein the non-aqueous electrolyte solution further include (a) a polyfunctional compound including two or more functional groups, at least one of which is an acryl group, and (b) an anion receptor selected from the group consisting of a borane compound, a borate compound and a mixture thereof.

Preferably, the polyfunctional compound includes two or more acryl groups. As the polyfunctional compound, there can be used, for example, tetraethylene glycol diacrylate, polyethylene glycol diacrylate having a molecular weight of 50 to 20,000, bisphenol A ethoxylated diacrylate having a molecular weight of 100 to 10,000, 1,4-butanediol diacrylate, 1,6-hexandiol diacrylate, neopentyl glycol dimethacrylate, trimethylolpropane triacrylate, ditrimethylolpropane tetraacrylate, dipentaerythritol hexaacrylate, dipentaerythritol pentaacrylate, tis[2-(acryloyloxy)ethyl]isocyanurate or a mixture thereof. [ 상응하는 청구범위 제3항을 참고하여 위 2개의 화합물을추가하였습니다]

Preferably, the borane compound is represented by Formula 1:

$$R_2-B(R_1)(R_3) \qquad (1)$$

wherein $R_1$ to $R_3$ are each independently hydrogen, halogen, $C_1$-$C_6$ alkyl or silyl.

Preferably, the borate compound is represented by Formula 2:

(2)

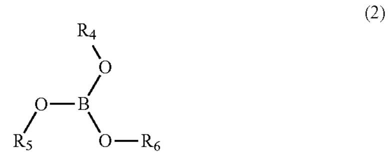

wherein $R_4$ to $R_6$ are each independently hydrogen, halogen, $C_1$-$C_6$ alkyl or silyl.

The components (a) and (b) may be present in amounts of 0.05 to 10% by weight, respectively, based on the total weight of the non-aqueous electrolyte solution.

The present invention also provides a lithium secondary battery including an anode, a cathode and the non-aqueous electrolyte solution. The anode includes an aqueous binder, preferably, styrene-butadiene rubber (SBR).

Advantageous Effects

The non-aqueous electrolyte solution of the present invention has the following effects.

First, the acryl group-containing polyfunctional compound of the non-aqueous electrolyte solution forms a stable SEI film on the surface of an anode. The anion receptor, such as a borane compound or a borate compound, elutes LiF from the SEI film and controls the LiF content of the SEI film. Therefore, the use of the non-aqueous electrolyte solution according to the present invention allows for a controlled resistance of the SEI film, thus achieving improved cycle life characteristics of a battery.

Second, the LiF content of the SEI film is markedly increased when an aqueous binder is used for an anode compared to when a solvent-based binder is used. The anion receptor can efficiently solve problems associated with the use of the aqueous binder. Therefore, the non-aqueous electrolyte solution of the present invention provides advantages, for example, economic efficiency, environmental friendliness and enhanced binding effects, resulting from the use of the aqueous binder, thus enabling the manufacture of a lithium secondary battery with high capacity.

DESCRIPTION OF DRAWINGS

FIG. 1 shows X-ray photoelectron spectra (XPS) of anode surfaces of batteries manufactured in Example 1 and Comparative Example after being charged at 0.1 C.

MODE FOR INVENTION

The present invention will now be described in detail. It should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

The present invention provides a non-aqueous electrolyte solution for a lithium secondary battery including an electrolyte salt and an organic solvent, wherein the non-aqueous electrolyte solution further include (a) a polyfunctional compound including two or more functional groups, at least one of which is an acryl group, and (b) an anion receptor selected from the group consisting of a borane compound, a borate compound and a mixture thereof.

The polyfunctional compound (a) is polymerized at a potential lower than that of the solvent when initially charged to form a SEI film on the surface of an anode.

Preferably, the polyfunctional compound (a) includes two or more acryl groups. Examples of preferred polyfunctional compounds include, but are not limited to, tetraethylene glycol diacrylate, polyethylene glycol diacrylate having a molecular weight of 50 to 20,000, bisphenol A ethoxylated diacrylate having a molecular weight of 100 to 10,000, 1,4-butanediol diacrylate, 1,6-hexandiol diacrylate, neopentyl glycol dimethacrylate, trimethylolpropane triacrylate, ditrimethylolpropane tetraacrylate, dipentaerythritol hexaacrylate, dipentapentaerythritol pentaacrylate, and tis[2-(acryloyloxy)ethyl]isocyanurate.
[ 상응하는 청구범위 제3항을 참고하여 위 2개의 화합물을추가하였습니다]
These polyfunctional compounds may be used alone or as a mixture of two or more thereof.

The SEI film formed from the component (a) is highly stable but increases the content of LiF therein, acting as a high resistance during charge/discharge. Particularly, the water content of an anode is increased when an aqueous binder is used for the anode, unlike when a solvent-based binder such as PVdF is used, so that the content of hydrofluoric acid in the non-aqueous electrolyte solution is considerably increased, leading to an increase in the amount of LiF in the SEI film formed from the component (a).

This problem is solved by the addition of the anion receptor (b) selected from the group consisting of a borane compound, a borate compound and a mixture thereof. That is, the anion receptor elutes LiF from the SEI film to lower the LiF content of the SEI film. As a result, the resistance of the SEI film is lowered, leading to an improvement in the cycle life characteristics of a battery.

Preferably, the borane compound is represented by Formula 1:

$$R_2-B(R_1)(R_3) \quad (1)$$

wherein $R_1$ to $R_3$ are each independently hydrogen, halogen, $C_1$-$C_6$ alkyl or silyl.

Preferably, the borate compound is represented by Formula 2:

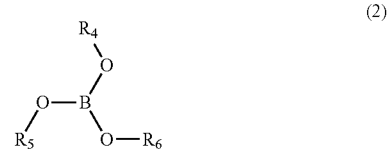

(2)

wherein $R_4$ to $R_6$ are each independently hydrogen, halogen, $C_1$-$C_6$ alkyl or silyl.

The amounts of the components (a) and (b) are suitably determined taking into consideration the cycle life characteristics and performance of a battery. The components (a) and (b) are preferably added in amounts of 0.05 to 10% by weight, respectively, based on the total weight of the non-aqueous electrolyte solution.

The organic solvent is not particularly limited and may be any of those commonly used in non-aqueous electrolyte solutions. The organic solvent can be selected from the group consisting of cyclic carbonates, linear carbonates, lactones, ethers, esters, acetonitrile, lactams, ketones, and mixtures thereof.

Non-limiting examples of the cyclic carbonates include ethylene carbonate (EC), propylene carbonate (PC), butylene carbonate (BC) and fluoroethylene carbonate (FEC). Non-limiting examples of the linear carbonates include diethyl carbonate (DEC), dimethyl carbonate (DMC), dipropyl carbonate (DPC), ethyl methyl carbonate (EMC) and methyl propyl carbonate (MPC). These carbonates may be used alone or as a mixture of two or more thereof. A non-limiting example of the lactones is γ-butyrolactone (GBL). Non-limiting examples of the ethers include dibutyl ether, tetrahydrofuran, 2-methyltetrahydrofuran, 1,4-dioxane, 1,2-dimethoxyethane and 1,2-diethoxyethane. Non-limiting examples of the esters include methyl formate, ethyl formate, propyl formate, methyl acetate, ethyl acetate, propyl acetate, methyl propionate, ethyl propionate, butyl propionate and methyl pivalate. A non-limiting example of the lactams is N-methyl-2-pyrrolidone (NMP). A non-limiting example of the ketones is poly(methyl vinyl ketone). Halogenated derivatives of the organic solvents may also be used. These organic solvents may be used alone or as a mixture of two or more thereof.

The electrolyte salt is not particularly limited and may be any one those commonly used in non-aqueous electrolyte solutions.

The electrolyte salt may be a combination of (i) a cation selected from the group consisting of, but not limited to, $Li^+$, $Na^+$ and $K^+$ and (ii) an anion selected from the group consisting of, but not limited to, $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$. A mixture of two or more kinds of electrolyte salts may be used. Lithium salts are particularly preferred. Examples of preferred lithium salts include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$.

The present invention also provides a lithium secondary battery including the non-aqueous electrolyte solution. The lithium secondary battery of the present invention is intended to include general lithium secondary batteries, such as lithium metal secondary batteries, lithium ion secondary batteries, lithium polymer secondary batteries and lithium ion polymer secondary batteries.

The lithium secondary battery of the present invention can be manufactured by a suitable method known in the art, for example, by interposing a porous separator between a cathode and an anode and by injecting the non-aqueous electrolyte solution into the electrode assembly.

The electrodes of the lithium secondary battery can be produced by a suitable method known in the art. For example, each of the electrodes may be produced by mixing an electrode active material, a solvent, and optionally together with a binder, a conductive material and/or a dispersant, with stirring to prepare a slurry, coating the slurry on a current collector made of a metal material, followed by compressing and drying.

The cathode active material may be a lithium-transition metal composite oxide such as $LiM_xO_y$ (M=Co, Ni, Mn, $CO_aNi_bMn_c$). Examples of, suitable lithium-transition metal composite oxides include, but are not limited to: lithium-manganese composite oxides, such as $LiMn_2O_4$; lithium nickel oxides, such as $LiNiO_2$; lithium cobalt oxides, such as $LiCoO_2$; lithium-transition metal composite oxides in which the manganese, nickel and cobalt elements of the lithium-manganese, lithium-nickel and lithium-cobalt oxides are partially replaced with other transition metals; and lithium-containing vanadium oxides.

The anode active material may be any of those that can be used in anodes of conventional lithium secondary batteries, and non-limiting examples thereof include lithium metal, lithium alloys, carbon, petroleum coke, activated carbon, graphite and carbon fiber capable of intercalating/deintercalating lithium ions. Metal oxides such as $TiO_2$ and $SnO_2$ having a potential of less than 2 V for lithium may be used without limitation. Carbon materials such as graphite, carbon fiber and activated carbon are particularly preferred.

Each of the current collectors is made of a highly conductive metal material. Any metal material that is not reactive in the voltage range of the battery may be used for the current collectors so long as the slurry of the electrode active material can easily be adhered thereto. Non-limiting examples of suitable materials for the cathode current collector include aluminum and nickel foils. Combinations of the metal foils may also be used. Non-limiting examples of suitable materials for the anode current collector include copper, gold, nickel and copper alloy foils. Combinations of the metal foils may also be used.

Binders are used to bind active material particles to anodes of lithium secondary batteries in order to maintain the molded shapes of the anodes. Examples of such binders include polytetrafluoroethylene (PTFE), polyvinylidene fluoride (PVdF), and styrene butadiene rubber (SBR). Binders are classified into solvent-based binders, typified by polyvinylidene fluoride (PVdF), and aqueous binders, typified by styrene-butadiene rubber (SBR). Aqueous binders are more economical, environmentally friendly and harmless to workers' health than solvent-based binders. Aqueous binders are advantageous in increasing the proportion of active materials per unit volume due to their better binding effects than solvent-based binders, thus achieving high battery capacity. The use of the non-aqueous electrolyte solution in the lithium secondary battery of the present invention can overcome problems associated with the use of an aqueous binder, enabling a higher capacity of the battery. The aqueous binder is preferably styrene-butadiene rubber (SBR). As is well known, the aqueous binder may be dispersed together with a thickener such as carboxymethyl cellulose (CMC) in water before being applied to the anode.

The conductive material may be any electrically conductive material that does not cause chemical changes in electrochemical devices. Generally, carbon black, graphite, carbon fiber, carbon nanotubes, metal powder, conductive metal oxides and organic conductive materials can be used. Examples of currently available commercial products for the conductive material include acetylene black series (Chevron Chemical Company and Gulf Oil Company), Ketjen Black EC series (Armak Company), Vulcan XC-72 (Cabot Company), and Super P (MMM Company).

The solvent for forming each of the electrodes may be an organic solvent or water. Examples of suitable organic solvents include N-methylpyrrolidone (NMP), dimethylformamide (DMF), acetone, and dimethylacetamide. These solvents may be used alone or as a mixture of two or more thereof. The solvent for forming the anode is limited to water. The amount of the solvent used is appropriately determined by taking into consideration the coating thickness of the slurry and the production yield of the electrode. The solvent is used in an amount sufficient to dissolve and disperse the electrode active material, the binder and the conductive material.

The separator of the lithium secondary battery according to the present invention is not particularly limited. The separator is preferably a porous one. Non-limiting examples of suitable materials for the porous separator include polypropylene, polyethylene and polyolefin.

There is no restriction as to the shape of the lithium secondary battery according to the present invention. For example, the lithium secondary battery of the present invention may be cylindrical, prismatic, pouch-type and coin-type in shape including a can.

Hereinafter, the present invention will be explained in detail with reference to embodiments. The embodiments of the present invention, however, may take several other forms, and the scope of the invention should not be construed as being limited to the following examples. The embodiments of the present invention are provided to more fully explain the present invention to those having ordinary knowledge in the art to which the present invention belongs.

EXAMPLE 1

Preparation of Non-aqueous Electrolyte Solution $LiPF_6$ was dissolved in a mixture of ethylene carbonate (EC) and ethyl methyl carbonate (ENE) (3:7 (v:v)) as organic solvents to prepare a 1 M solution, and then dipentaerythritol hexaacrylate (Formula 3) and tripropyl borate were added thereto to prepare a non-aqueous electrolyte solution. The dipentaerythritol hexaacrylate and the tripropyl borate were used in amounts of 0.5 wt % and 0.1 wt %, respectively, based on the total weight of the non-aqueous electrolyte solution.

(3)

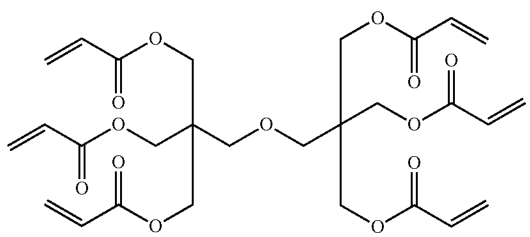

Manufacture of Lithium Secondary Battery

In accordance with a standard method known in the art, a pouch type battery having a bi-cell structure was manufactured using the non-aqueous electrolyte solution, $LiCoO_2$ as a cathode active material, artificial graphite as an anode active material and SBR as a binder for an anode.

EXAMPLE 2

A non-aqueous electrolyte solution was prepared and a lithium secondary battery was manufactured in the same manner as in Example 1, except that tripropyl borane was used instead of tripropyl borate.

EXAMPLE 3

A non-aqueous electrolyte solution was prepared and a lithium secondary battery was manufactured in the same manner as in Example 1, except that 1 wt % of fluoroethylene carbonate represented by Formula 4 was further added.

(4)

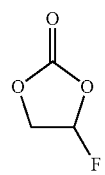

EXAMPLE 4

A non-aqueous electrolyte solution was prepared and a lithium secondary battery was manufactured in the same manner as in Example 1, except that neopentyl glycol dimethacrylate was used instead of dipentaerythritol hexaacrylate.

EXAMPLE 5

A non-aqueous electrolyte solution was prepared and a lithium secondary battery was manufactured in the same manner as in Example 1, except that dipentaerythritol pentaacrylate was used instead of dipentaerythritol hexaacrylate.

COMPARATIVE EXAMPLE 1

A non-aqueous electrolyte solution was prepared and a lithium secondary battery was manufactured in the same manner as in Example 1, except that tripropyl borate was not added.

COMPARATIVE EXAMPLE 2

A non-aqueous electrolyte solution was prepared and a lithium secondary battery was manufactured in the same manner as in Example 3, except that tripropyl borane was not added.

COMPARATIVE EXAMPLE 3

A non-aqueous electrolyte solution was prepared and a lithium secondary battery was manufactured in the same manner as in Example 1, except that dipentaerythritol hexaacrylate was not added.

COMPARATIVE EXAMPLE 4

A non-aqueous electrolyte solution was prepared and a lithium secondary battery was manufactured in the same manner as in Example 2, except that dipentaerythritol hexaacrylate was not added.

COMPARATIVE EXAMPLE 5

A non-aqueous electrolyte solution was prepared and a lithium secondary battery was manufactured in the same manner as in Example 4, except that tripropyl borate was not added.

COMPARATIVE EXAMPLE 6

A non-aqueous electrolyte solution was prepared and a lithium secondary battery was manufactured in the same manner as in Example 5, except that tripropyl borate was not added.

COMPARATIVE EXAMPLE 7

A non-aqueous electrolyte solution was prepared and a lithium secondary battery was manufactured in the same manner as in Example 1, except that dipentaerythritol hexaacrylate and tripropyl borate were not added.

Evaluation of Cycle Life Characteristics

The pouch type batteries manufactured in Examples 1-5 and Comparative Examples 1-7 were charged/discharged 200 times at 0.5 C. The capacity retention rates of the batteries relative to their initial capacities were measured. The results are shown in Table 1.

TABLE 1

| | Additives | Capacity retention rates (%) after 200 charge/discharge cycles |
|---|---|---|
| Example 1 | Dipentaerythritol hexaacrylate 0.5 wt %<br>Tripropyl borate 0.1 wt % | 86.8 |
| Example 2 | Dipentaerythritol hexaacrylate 0.5 wt %<br>Tripropyl borane 0.1 wt % | 83.9 |
| Example 3 | Dipentaerythritol hexaacrylate 0.5 wt %<br>Fluoro-ethylene carbonate 1 wt %<br>Tripropyl borate 0.1 wt % | 87.2 |
| Example 4 | Neopentyl glycol dimethacrylate 0.5 wt %<br>Tripropyl borate 0.1 wt % | 78.1 |
| Example 5 | Dipentaerythritol pentaacrylate 0.5 wt %<br>Tripropyl borate 0.1 wt % | 84.4 |

TABLE 1-continued

| | Additives | Capacity retention rates (%) after 200 charge/discharge cycles |
|---|---|---|
| Comparative Example 1 | Dipentaerythritol hexaacrylate 0.5 wt % | 63.3 |
| Comparative Example 2 | Dipentaerythritol hexaacrylate 0.5 wt % Fluoro-ethylene carbonate 1 wt % | 64.6 |
| Comparative Example 3 | Tripropyl borate 0.1 wt % | 66.7 |
| Comparative Example 4 | Tripropyl borane 0.1 wt % | 63.1 |
| Comparative Example 5 | Neopentyl glycol dimethacrylate 0.5 wt % | 56.5 |
| Comparative Example 6 | Dipentaerythritol pentaacrylate 0.5 wt % | 61.3 |
| Comparative Example 7 | — | 51.2 |

As can be seen from the results in Table 1, the lithium secondary batteries of Examples 1-5, each of which was manufactured by applying the non-aqueous electrolyte solution including the acryl group-containing polyfunctional compound and the anion receptor to the anode using the aqueous binder, showed much better cycle life characteristics than the lithium secondary batteries of Comparative Examples 1-7, each of which was manufactured using either one or none of the acryl group-containing polyfunctional compound and the anion receptor.

Evaluation of LiF Content of SEI Films

The batteries of Example 1 and Comparative Example 1 were charged at 0.1 C. The anodes were separated from the batteries and their surfaces were analyzed by XPS. The results are shown in FIG. 1.

Referring to FIG. 1, the battery of Example 1, in which the non-aqueous electrolyte solution including the acryl group-containing polyfunctional compound and the anion receptor was applied to the anode using the aqueous binder, had a much lower LiF content in the SEI film than the battery of Comparative Example 1, in which the non-aqueous electrolyte solution including the acryl group-containing polyfunctional compound only was applied to the anode using the aqueous binder. These results are because the anion receptor eluted LiF from the SEI film formed on the anode surface, thus facilitating charging/discharging of the battery.

What is claimed is:

1. A non-aqueous electrolyte solution for a lithium secondary battery comprising an electrolyte salt and an organic solvent, wherein the non-aqueous electrolyte solution further comprises (a) a polyfunctional compound comprising two or more functional groups, at least one of which is an acryl group, and (b) an anion receptor selected from the group consisting of a borane compound, a borate compound and a mixture thereof, wherein the borane compound is represented by Formula 1:

$$R_2-B(R_1)(R_3) \qquad (1)$$

wherein $R_1$ to $R_3$ are each independently hydrogen, halogen, $C_1$-$C_6$ alkyl or silyl; and wherein the borate compound is represented by Formula 2:

(2)

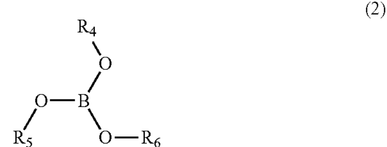

wherein $R_4$ to $R_6$ are each independently hydrogen, halogen, $C_1$-$C_6$ alkyl or silyl.

2. The non-aqueous electrolyte solution according to claim 1, wherein the polyfunctional compound comprises two or more acryl groups.

3. The non-aqueous electrolyte solution according to claim 2, wherein the polyfunctional compound is selected from the group consisting of tetraethylene glycol diacrylate, polyethylene glycol diacrylate having a molecular weight of 50 to 20,000, bisphenol A ethoxylated diacrylate having a molecular weight of 100 to 10,000, 1,4-butanediol diacrylate, 1,6-hexandiol diacrylate, neopentyl glycol dimethacrylate, trimethylolpropane triacrylate, ditrimethylolpropane tetraacrylate, dipentaerythritol hexaacrylate, dipentapentaerythritol pentaacrylate, tis[2-(acryloyloxy)ethyl]isocyanurate, and mixtures thereof.

4. The non-aqueous electrolyte solution according to claim 1, wherein the components (a) and (b) are present in amounts of 0.05 to 10% by weight, respectively, based on the total weight of the non-aqueous electrolyte solution.

5. The non-aqueous electrolyte solution according to claim 1, wherein the electrolyte salt is a lithium salt.

6. The non-aqueous electrolyte solution according to claim 5, wherein the lithium salt is selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$, $LiC_4BO_8$, and mixtures thereof.

7. The non-aqueous electrolyte solution according to claim 1, wherein the organic solvent is a cyclic carbonate selected from the group consisting of ethylene carbonate, propylene carbonate, butylene carbonate and fluoroethylene carbonate, a linear carbonate selected from the group consisting of diethyl carbonate, dimethyl carbonate, ethyl methyl carbonate, dipropyl carbonate, methyl propyl carbonate (MPC), and a mixture thereof.

8. A lithium secondary battery comprising an anode, a cathode and the non-aqueous electrolyte solution according to claim 1.

9. A lithium secondary battery according to claim 8, wherein the anode comprises an aqueous binder.

10. A lithium secondary battery according to claim 9, wherein the aqueous binder is styrene-butadiene rubber (SBR).

* * * * *